United States Patent Office 3,074,421
Patented Jan. 22, 1963

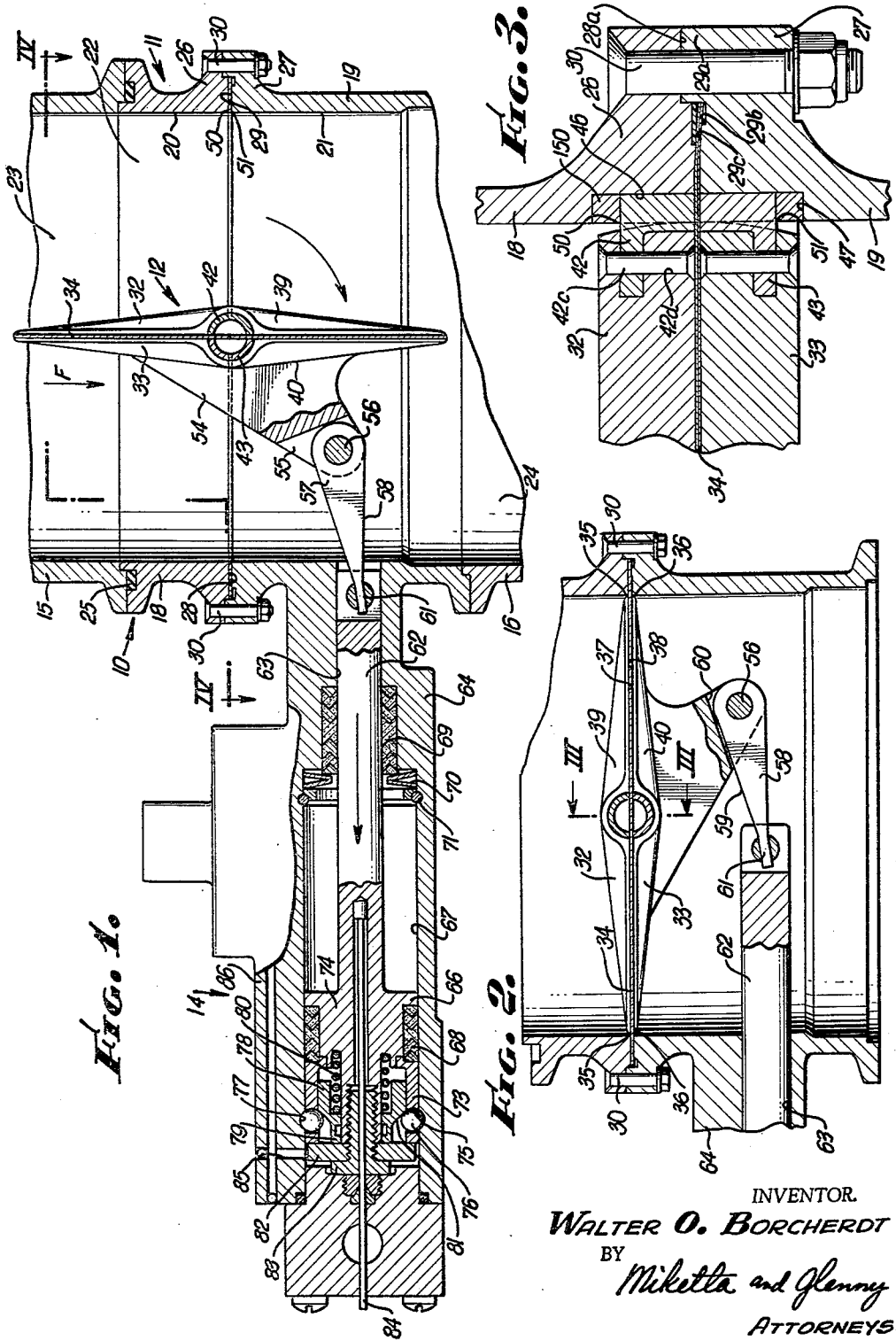

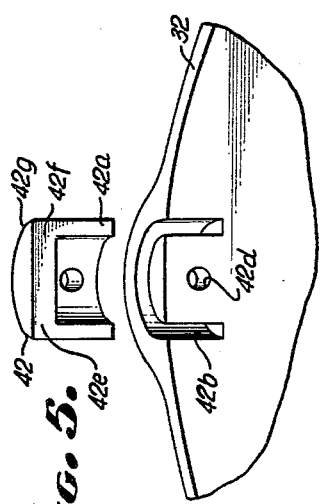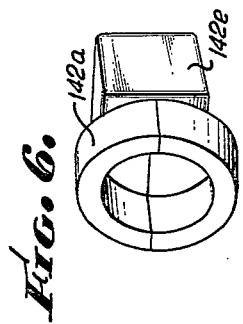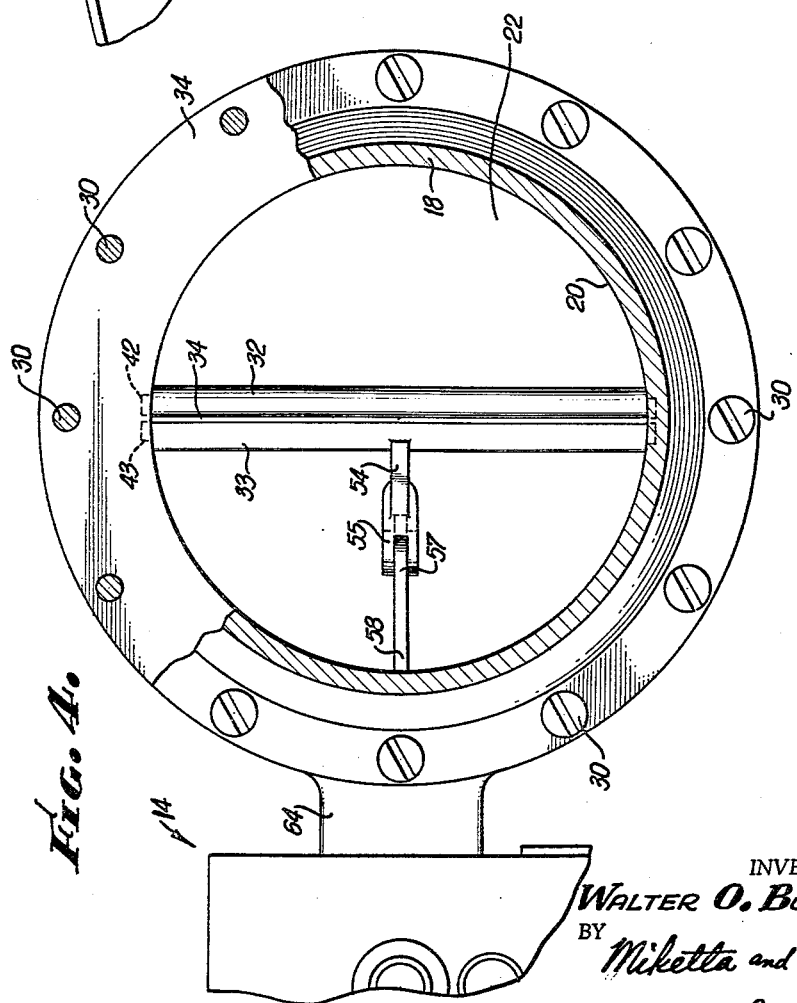

3,074,421
SHEARABLE STORAGE VALVE MEANS
Walter O. Borcherdt, Claremont, Calif., assignor to B. H. Hadley, Inc., Pomona, Calif., a corporation of California
Filed Apr. 17, 1961, Ser. No. 103,613
18 Claims. (Cl. 137—68)

This invention relates to a leakless storage valve means of disc or butterfly type and more particularly to a storage valve means incorporating features of construction which provide positive leak proof retention of fluids under low pressure for long extended storage periods and which affords rapid actuation of the valve means even after such long storage periods.

In some installations it is desirable to hold in suitable storage means such as pressure tanks and the like various compressible and non-compressible fluids for relatively long periods of time. During the storage period it is desirable that valve means for discharge of the stored fluid be so constructed that a complete and full seal is provided; that is, there should be no, or zero, leakage through the valve means. At the same time the valve means associated with such storage means is often required to be so constructed that it may be rapidly opened and actuated. Such rapid actuation of such a storage valve means requires that the valve materials have little or a minimum of ageing characteristics, resist corrosion from the stored fluid or other elements, and that the valve means require a minimum of attention during the storage period. It is apparent that it is undesirable to test such a valve means during the storage period as by opening and closing such a storage valve means.

Prior proposed storage valve means known to me have usually deteriorated in some part of their structure after long storage periods so that either slight leakage occurred or parts of the valve became affected by the stored fluid or other surrounding environmental conditions. Movable valve parts were often stuck and rendered initially inoperative. Usually an indeterminate time and effort were required to open such valve means and zero leakage storage valves known to me have no reclosure capabilities. Such uncertainty in sealing and later operation have made many prior proposed storage valve means undesirable for many purposes.

The present invention contemplates a valve means which obviates the disadvantages of prior proposed storage valve means and provides a valve means capable of zero leakage, rapid actuation and operation after long storage periods, a minimum of attention during such storage periods, and effective reclosure characteristics after opening.

The primary object of the present invention is to provide a leak-proof storage valve means of novel construction and operation.

An object of the invention is to provide a valve means of disc or butterfly type having a shearable diaphragm member associated with the valve means so that positive zero leakage is provided.

Another object of the invention is to provide a valve means including a shearable diaphragm member held and associated with the valve means in a novel manner.

Another object of the invention is to provide a valve means including a valve closure member comprising a pair of valve closure sections constructed and assembled with a shearable diaphragm member in a novel manner.

A further object of the invention is to provide a valve means as described above wherein the valve closure member is pivotally mounted in the valve body means in a novel manner.

A still further object of the invention is to disclose and provide a valve means as mentioned above wherein the valve closure member includes closure sections and a shearable diaphragm member between said sections, said diaphragm member and closure sections being imperforate and unpierced throughout their entire structure and are held in assembly by valve body portions.

A more specific object of the invention is to provide valve closure sections for a valve means as described above which include trunnion extensions pivotally mounted in and held in assembly by the valve body means.

Still another object of the invention is to disclose a valve means having valve closure sections as mentioned above and including means associated with one of the closure sections for actuating the value closure means.

A specific object of the invention is to disclose a shearable diaphragm member of suitable material which may be bonded to either one or both of two valve closure sections associated with the diaphragm member.

A still further object of the invention is to disclose a novel construction of a shearable diaphragm which in different examples may be a single ply or sheet of foil, a foil laminate, a composite foil laminate including sheets or laminae of different shearable material, and a shearable laminate including an annulus of resilient plastic material affording a seal means.

Still another object of the invention is to disclose examples of a novel construction for mounting, assembling, and disassembling a valve member for use as a butterfly type shear disc in which trunnion surfaces may be provided on either a valve member or a valve body.

The invention contemplates a valve construction and a means for assuring a clean, sharp, shear or cut of a shearable diaphragm so that contamination of stored fluid by the valve means, for example, particles from the diaphragm, will be avoided and substantially eliminated.

The present invention contemplates a shearable, disc-type storage valve means embodying simplicity of design and construction, ready fabrication, ready disassembly and then reassembly for replacing the sheared diaphragm with a full diaphragm to again afford a positive full seal or zero leakage after opening of the valve means, and adapted to provide a nearly leak-tight reclosure of the valve passageway after the shearable diaphragm member has been sheared by initial opening of the valve closure means. An exemplary embodiment of the invention is shown and described hereafter.

In the drawings:

FIG. 1 is a sectional view of a valve means embodying this invention, the section being taken in a plane bisecting the valve means and showing the valve closure member in valve open position;

FIG. 2 is a fragmentary sectional view taken in the same plane as FIG. 1 and showing the valve closure means in valve closed position;

FIG. 3 is an enlarged fragmentary sectional view taken in the plane indicated by line III—III of FIG. 2 and showing a pivotal mounting of the valve closure member;

FIG. 4 is a fragmentary sectional view taken in the planes indicated by lines IV—IV of FIG. 1;

FIG. 5 is an enlarged fragmentary perspective view of trunnion means provided on a valve closure section for pivotal mounting of the valve closure means;

FIG. 6 is an enlarged perspective view of a different example of a set of mating trunnions;

FIG. 7 is a fragmentary sectional view of the shearable diaphragm used in the valve means of FIG. 1;

FIG. 8 is a fragmentary sectional view of a composite shearable diaphragm adapted for use with the valve means of this invention.

In the exemplary embodiment of the invention shown in the drawings, a leakproof storage valve means 10 of shearable disc or butterfly type may generally comprise a valve body means 11, a valve closure means 12 pivotally mounted in the valve body means 11, and an actuating means 14 for the closure means 12.

The storage valve means 10 may be connected by a discharge pipe 15 in fluid communication with a storage means (not shown) which may contain fluids adapted to be stored for long periods of time, such fluids being of various types and character, and may be compressible or non-compressible and include liquids, gases and the like. A pipe 16 may be connected to the discharge side of valve means 10, the direction of flow of fluid being indicated by arrow F, FIG. 1. The pipes 15 and 16 may be connected to the valve means in any suitable manner to afford a leak-tight, sealed connection, and such connections are only generally indicated and not described in detail.

The valve body means 11 may comprise separable valve body portions 18 and 19 providing internal cylindrical wall surfaces 20 and 21 of corresponding diameter and defining a through passageway 22 which may correspond in flow area to the passageways 23 and 24 defined by pipes 15 and 16 which are connected to the valve body means 11. A seal 25 may be provided at the connection between the valve body portion 18 and the pipe 15, valve body portion 18 being located on the inlet side of the valve means 10.

Means for interconnecting the separable valve body portions 18 and 19 may include external radially outwardly directed annular mating flanges 26 and 27 respectively on body portions 18 and 19. The flanges may be secured together by a plurality of circumferentially spaced screw bolt assemblies and the joint formed by said flanges generally define a plane or a planar zone extending transversely across the body means 11.

Valve closure means 12 provides a complete zero leakage closure for passageway 22 and such valve closure means 12 may comprise valve closure sections 32 and 33 and a shearable imperforate unpierced diaphragm means or member 34 disposed between said closure sections 32 and 33 and projecting radially therebeyond for positioning of its peripheral margin between opposed annular surfaces 28 and 29 of the flanges 26 and 27. The diaphragm member 34 may be made of any suitable material unaffected by the type of fluid being stored, having resistance to ageing so that it will retain its impervious sealing characteristics for long periods of time, and being capable of being cleanly sheared without loss of particles or portions thereof upon actuation of the valve closure means. One example of such material is a sheet-like foil of selected thickness of aluminum or aluminum alloy. In the specific example of the diaphragm member 34 four sheets of aluminum foil are employed in superimposed relation to form a bonded or unbonded sheet laminate. Diaphragm member 34 may include at its outer peripheral margin a narrow annulus 34a of suitable plastic resilient material such as Teflon or other elastomeric material (FIG. 7). Thus the diaphragm member provides an impervious barrier and seal across the full flow area of passageway 22 and extends in an unbroken, uninterrupted manner between the flanges 26 and 27.

In FIG. 8 another example of a diaphragm member 34' is shown and comprises a plurality of sheets of suitable foil of selected thickness and a sheet 34p of suitable plastic or elastomeric material such as Teflon which is of the same size and configuration as the foil sheets. The several laminae of diaphragm member 34' may be bonded or unbonded and preferably the plastic lamina 34p is disposed in assembly on the downstream side of the valve closure. Such disposition of diaphragm member 34' affords some protection against possible pre-shearing of the diaphragm member during assembly. Since the plastic lamina 34p will be first to shear upon actuation and since it is somewhat more tough and more yieldable as compared to the metal foil, more effective and better shearing is afforded by such disposition of the diaphragm member.

Means for providing a tight effective seal for the joint made by flanges 26 and 27 which comprise therebetween the peripheral margin of diaphragm member 34 may be provided by forming the surfaces 28 and 29 respectively of said flanges with a complementary outer recess 28a on flange 26 to receive an outer chine 29a formed on flange 27. Chine 29a includes an inner annular groove 29b adapted to provide space for displacement of peripheral edges 34b of diaphragm member 34 and to accommodate any flow of the Teflon annulus 34a. The flange surface 29 adjacent groove 29b may be provided with a slight taper as at 29c. The diameter of the inner wall of chine 29a which may fit into the recess 28a defines the maximum diameter of diaphragm member 34 so that when diaphragm member 34 is positioned on valve body portion 19 during assembly member 34 may be readily located and properly aligned. When the nut and bolt assemblies 30 are tightened it will be apparent that the peripheral margins of the diaphragm member are tightly clamped in sealing relation between the flanges.

The valve closure sections 32 and 33 may be of similar construction and may be made of an age-resistant material which is unaffected by the fluid being stored such as an aluminum alloy. Closure sections 32 and 33 are provided with corresponding outer peripheral or circumferential edges 35 and 36 and the diameter of said closure sections may be slightly less than the internal diameter of passageway 22 so that a normal or somewhat close fit is provided between the circumferential edges 35 and 36 and the internal cylindrical surfaces 20 and 21 of the valve body portions. The space or tolerance between said edges 35 and 36 and cylindrical surfaces 20 and 21 is spanned by diaphragm member 34.

The closure sections 32 and 33 are provided with planar flat finished faces 37 and 38 respectively, face 37 being seated against the inlet side of diaphragm member 34 and face 38 being seated against the outlet side of diaphragm 34. In some instances the faces 37 and 38 may be bonded by suitable adhesive material to the diaphragm 34. In some examples only one of said faces may be desired to be bonded to the diaphragm member 34. The closure sections 32 and 33 may be provided with outer shallow contoured and faired faces 39 and 40 respectively so that said sections when held in assembly will present a bladelike edge to the flow of fluid as indicated in FIG. 1, and will present a minimum of area opposed to the flow of fluid. The faces 39 and 40 may be shaped in accordance with an arc having relatively great diameter to form the surface portion at a mid-diameter, the surface portion lying on both sides of said mid-diameter at first very gradually decreasing the radius until surface portions remote from said mid-diameter are formed with a relatively small radius in order to provide a sufficient thickness of metal at and about the axis of rotation of the valve member. With such faired configuration of the valve closure means relatively smooth flow of fluid through the valve means will be permitted in valve open position, and such flow will be with a minimum of differential pressure between the inlet and outlet sides of the valve means.

Means for pivotally mounting the valve closure sections 32 and 33 which are separable and not interconnected with each other and for holding the valve sections 32 and 33 in assembly may comprise oppositely directed radially outwardly extending mating or companion trunnion portions or projections 42 and 43 cooperatively associated with valve sections 32 and 33. A pair of mating projections 42 and 43 at thickened portions of the closure sections cooperate to provide a full trunnion with a portion of the diaphragm member 34 therebetween. In FIG. 5 trunnion element 42 may comprise a cylindrical wall 42a received in a semicircular recess 42b formed in valve closure section 32, a pin 42c extending through said wall 42a and closure section 32 as at 42d retains the trunnion element 42 in fixed assembly with closure section 32. The semi-cylindrical outwardly projecting solid end 42e of the trunnion is provided with a finished face 42f and edge faces of the wall 42a lie in the same plane as the face 37 of the closure section. The axis of the mating trunnion elements 42, 43 and the axis of the pivotal mounting of the valve closure means 12 may lie in the plane of the diaphragm member 34.

In this example the solid semi-cylindrical portion 42e has an outer semi-cylindrical face 42g adapted to rotatively support the closure means. In FIG. 6 is shown another example of a split trunnion member wherein the outer projecting portion 142e may be polygonal or square for non-rotative cooperation with a valve body. A cylindrical wall 142a received within a recess such as 42b may rotate within said recess, it being understood that pin 42c is not used. In the trunnion example of FIG. 6 it will be apparent that when the valve closure means is turned to open position a semi-cylindrical wall 142a will extend partly into the recess 42b formed on section 32 and partly into the corresponding recess formed on section 33. Thus each of the semi-cylindrical walls 142a extend across the plane of the diaphragm member 34 and during flow conditions will serve to hold the diaphragm member from being stripped or flushed out of the space between sections 32 and 33.

It will be understood of course that trunnion elements such as 42 and 43 may be integrally formed with the closure sections and that the peripheral edges of sections 32 and 33 may be made of heavier metal section to reinforce and strengthen pivotal mounting of the valve closure means.

Means for receiving the mating trunnion elements 42, 43 carried by the valve closure sections may include generally semi-cylindrical recesses 46 and 47 formed in the valve body portions 18 and 19 respectively at the flanges 26 and 27. If desired, the recess surfaces may be lined with a bearing material to facilitate pivotal movement of the valve closure means. As best shown in FIG. 3 a semi-cylindrical hardened edge element 150 may be seated in their respective valve body portions 18 and 19 to line and surround the edge of semi-cylindrical recesses 46 and 47. Such edge elements provide a sharp hard corner 50 and 51 to facilitate shearing and cutting of diaphragm member 34.

As mentioned above, an important feature of the present valve means is the manner in which the valve closure means is pivotally mounted, held in assembly, and is readily disassembled. In assembly of the valve body means and the valve closure means the valve body portions may be separated by removing the screw bolt assemblies 30. One of the valve closure sections, such as 33, may be positioned across the passageway 22 by reception of the pinned trunnion elements 43 in the recesses 47 in valve body portion 19. The diaphragm member 34 may then be laid across the face 38 of section 33, the faces 43f of trunnion elements 43 and also across the annular surface 29 of the flange 27. The diaphragm member 34 is aligned by the chine 29a. The other closure section 32 may then be laid upon the diaphragm member 34 with its trunnion elements 42 in alignment and positioned over the mating trunnion elements 43 of the section 33. The valve body portion 18 may then be placed over the section 32 and the trunnion elements 42 received within the recesses 46. Body portions 18 and 19 may be precisely aligned by an alignment pin 90 outwardly of member 34 and receivable in bores in both body portions. The screw-bolt receiving holes of the flanges 26 and 27 are thus also aligned, and upon insertion of the bolt assemblies 30 thereinto and tightening of said assemblies, it will be readily apparent that the valve closure means is held in assembly and pivotally mounted in the valve body means. Also, it should be noted that the diaphragm member remains unbroken and unpierced. Thus the diaphragm member which spans the space or tolerance between the peripheral edges 35 and 36 of the valve closure sections and the internal cylindrical wall surfaces of the valve body portions presents only a fine, thin area to the pressure of fluid. At the same time, such fine line of diaphragm material in the said space or tolerance is capable of being sharply sheared upon pivotal movement of the valve closure means. Since the closure sections 32 and 33 are held in tight assembly with the diaphragm member therebetween, it will be apparent that the diaphragm member may be sharply sheared or cut as the peripheral edges 35 and 36 pass over the relatively sharp corners 50 and 51 formed by edge elements 150 and at the intersection of the internal cylindrical wall surfaces 20 and 21 of the valve body portions and flat annular surfaces 28 and 29 of the flanges.

The closure section 33 may be provided with a fin-like projection or member 54 of generally triangular shape and of thin metal section, as viewed from FIG. 4. The external contours of the fin-like projection 54 may be streamlined and the projection may be formed integrally with the closure section 33. The end of projection 54 may be formed with a somewhat thicker metal section 55 to provide a yoke for pivotally connecting, as at 56, one end 57 of an actuating link 58. As best seen in FIG. 2, link 58 may include a straight edge face 59 which may cooperate with the bottom wall 60 of the recess formed by the yoke 55 to provide a stop or abutment to prevent rotation of the valve closure member 12 in one direction when the valve closure member is in closed position.

The means 14 for actuating the valve closure member 12 into open position may comprise any suitable actuating means and in the example shown the actuating link 58 may be pivotally connected as at 61 to the free end of a piston rod 62 reciprocally slideable in a bore 63 provided in an actuator housing 64 formed integral with the valve body portion 19. In open position, FIG. 1, it will be noted that the end of the piston rod 62 is fully retracted within the bore 63 and that the link 58 and fin-like projection 54 are disposed in the flow of fluid. In closed position, FIG. 2, it will be noted that the piston rod 62 extends substantially to the center of the passageway and that the pivotal connection at 56 lies intermediate the pivotal axis of the closure member and the remote side of the passageway 22.

At the other end of piston rod 62 is a piston head 66 movable in a piston chamber 67 formed in actuator housing 64. Packing means 68 of suitable form and material may be provided at the piston head 66 and packing means 69 of suitable form and material may be provided around the piston rod 62. The packing means 69 may be retained under compression by a spring washer 70 of Belleville type held by a retainer ring means 71.

The piston head 66 may include a lock means for retaining the valve closure means 12 in lock open position. The piston head 66 may include a hollow cylindrical sleeve 73 seated on the cylinder head body portion 74 and against one end of the packing means 68. The sleeve 73 may include a plurality of diametrically opposed ports 75 in which may be carried a ball element 76. In lock open position, as shown in FIG. 1, the ball elements 76 are seated in detent recesses 77 formed in the cylinder wall of the actuator housing 64. Within the sleeve 73 is an inner insert sleeve 78 encircling and slideable upon an inner stem 79 formed in the outer end of the body portion 74. A spring 80 may bias the insert sleeve 78 outwardly and a tapered annular surface 81 provided on sleeve 78 engages ball element 76 to radially outwardly urge said elements into the detent recesses 77. A cylinder head cover plate 82 retains inner sleeve 78 and outer sleeve 73 in assembly, plate 82 being retained by a headed axial bolt 83. The cylinder head 66 and the axial retainer bolt 83 may be provided with an axial port for holding an elongated pin or rod 84 which extends beyond the outer end of the actuator casing 64 to visually indicate whether the valve closure means 12 is in open position.

It will be understood that when the cylinder head 66 is in its valve closed position that the ball elements 76 are radially inwardly moved so that they do not extend beyond the outer surface of the outer sleeve 73 and that the inner sleeve 78 is urged against the biasing spring 80 to form sufficient space for reception of the ball elements 76 within the circumference of the sleeve 73. When the valve closure means 12 is opened, it will be apparent that the biased sleeve 78 will urge the ball elements 76 outwardly into locking relation with the detent recesses 77.

The piston head 66 and piston rod 62 may be urged into valve open position by any suitable means such as fluid pressure means having any suitable control means therefor. The details of the actuating means are not described herein, and it may be noted that such pressure fluid may be introduced into the piston head chamber 67 through a port 85 formed in an actuator casing cover 86 and having fluid communication with a pressure fluid source controlled in suitable desired manner.

In operation, when the piston rod 62 is urged outwardly by fluid pressure introduced into the piston chamber 67, a turning movement will be imparted to the valve closure means 12 about its pivotal axis by the pivotal connection of the actuating link 58 at 56 to the projection on the valve closure section 33. Such turning movement of the valve closure means will create a shearing force at the periphery of the valve closure means 12 which will progressively shear the diaphragm member 34 until the closure means lies parallel to the path of flow of the fluid. It should be noted that as the diaphragm member is sheared it is held and retained by the closure sections 32 and 33 and that the annular sheared portion thereof lying between the flanges 26 and 27 is similarly retained by said flanges. In final open position the valve closure means 12 is locked, as described above.

Since the storage valve means described above is primarily intended for use with storage of fluid for long periods of time, it is contemplated that once the valve has been opened it will probably remain open. However, if it is desired to again close the valve so as to store for another long period of time other fluid, the valve means of the present invention may be readily disassembled, the valve body portions separated, and the valve closure sections separated so that an unpierced new diaphragm member may be substituted for the sheared diaphragm member. Such disassembly and assembly of the valve body means may be readily and easily accomplished because of the simplicity of construction of the valve means.

In the event the valve is desired to be closed after opening, it will be apparent that the valve closure means will provide almost complete stoppage of flow of fluid through the valve when the valve closure means 12 is returned to closed position because of the relatively close fit between the edges of the valve sections and the walls of the passageway 22. It will be understood that such reclosure of the valve means will not accomplish leaktight closure of the valve means.

The reclosure characteristics of the valve means should be noted having in mind that each metal foil sheet may be about .0007", the aggregate thickness of the member 34 (4-ply) being about .0028". Upon shearing, the peripheral edge of the valve closure means 12 thus presents four foil or sheet edges; similarly the inner periphery of the sheared outer annular portion of member 34 between the flanges presents four sheet edges. Upon reclosure these very restrained limitedly free edges appear to cooperate with each other so as to provide a reclosure seal substantially more effective than when a single sheet is used for a diaphragm member.

It will be understood that precise clean shearing of diaphragm member 34 or other examples thereof will prevent and avoid contamination of fluid as it passes through the valve means from storage. Clean shearing will not provide loosened particles of foil nor will it provide a minutely ragged edge which may be readily deteriorated by the flow action of fluid.

It will be understood that essentially leakless reclosure of the valve means may be also accomplished by introducing rings of suitable resilient material on one or both sides of the unpierced diaphragm member in the valve body portions. Such sealing rings may be so designed and proportioned so that sealing contact between circumferential edge portions of the closure valve sections and such rings will effect substantially leakless closure of the valve closure member.

It will be understood that various changes and modifications may be made in the valve means described above which come within the spirit of this invention, and all such changes and modifications which come within the scope of the appended claims are embraced thereby.

I claim:

1. In a leakless storage valve means, the combination of: a valve body means having a passageway for flow of fluid from a storage means, said valve body means including separable valve body portions having means interconnecting said body portions in assembly and including opposed holding and sealing surfaces; a valve closure means for said passageway comprising valve closure sections and a thin shearable member held between said sections and extending between said holding and sealing surfaces for closing space between the outer periphery of the closure sections and the inner surfaces of the body portions; and means for pivotally mounting the closure means in the valve body means.

2. A valve means as stated in claim 1 including means connected to one of said valve closure sections for actuating the valve closure means.

3. In a leakless storage valve means, the combination of: a valve body means having an internal cylindrical surface defining a passageway for communication with a storage means for flow of fluid therethrough, said valve body means including separable valve body portions having means interconnecting said portions in assembly and including opposed holding and sealing surfaces outwardly of said passageway; a valve closure means for said passageway disposed between said valve body portions and comprising closure sections each having an outer periphery in close proximity to said internal cylindrical surfaces of said valve body means, said closure means including a thin shearable member held between said closure sections and extending between said holding and sealing surfaces on said valve body portions for closing space between the periphery of the closure sections and the internal surfaces of the body portions; and means for pivotally mounting the closure means in said valve body means about an axis lying in the plane of said shearable member.

4. A valve means as stated in claim 3 including means on said closure sections cooperable with said means interconnecting said body portions for holding said valve closure means in assembly.

5. A valve means as stated in claim 3 wherein said means interconnecting the valve body portions provide the sole means for holding said valve closure sections and shearable member in assembly.

6. A valve means as stated in claim 3 wherein said means for pivotally mounting said valve closure means includes a half trunnion at diametrically opposite points on each closure section, recessed means on said valve body portions at said holding surfaces, adjacent half trunnions on said closure sections being aligned and projecting into said recess means.

7. A valve means as stated in claim 6 wherein said shearable member extends between said half trunnions on said closure sections.

8. In a valve means of butterfly type, the combination of a valve body means providing a passageway and including separable valve body portions including flanges for interconnecting said valve body portions, said flanges including holding and sealing surfaces lying in a plane;

valve closure means for said passageway comprising a thin shearable diaphragm member extending across said passageway and held between the holding and sealing surfaces of the flanges, a valve closure section on one side of the diaphragm member, a closure section on the other side of the diaphragm member; means projecting from said closure sections and extending along the diaphragm member; and means provided on the valve body portions cooperable with said projecting means on said closure sections for holding the closure sections in assembly with the valve body means.

9. A valve means as stated in claim 8 wherein each closure section and projecting means includes a planar, smooth, uninterrupted face for seating against and holding the diaphragm member.

10. A valve means as stated in claim 8 wherein each closure section and projecting means includes a face seated against the diaphragm member and bonded thereto.

11. A valve means as stated in claim 8 wherein said projecting means and said cooperable means therewith provided on said valve body portions provide pivotal mounting of said valve closure means about an axis lying in the plane of the shearable diaphragm member.

12. A valve body means as stated in claim 8 including means connected to one of said closure sections for shearing said diaphragm member and actuating said valve closure means.

13. In a leakless storage valve means of butterfly type, the combination of a separable valve body means including valve body portions defining a passageway and externally extending flanges having opposed surfaces defining a plane; a valve closure means providing an imperforate leakless closure for said passageway at said plane and comprising solid imperforate valve closure sections having circumferences virtually corresponding to the inner circumference of said passageway, and a sheet-like imperforate material held between said section at said plane and extending beyond the outer circumference of said sections and between the opposed surfaces of said flanges for holding thereby; and means on said closure sections and means on said body portions cooperable in assembly for pivotally mounting the valve closure means while holding the valve closure means in assembly.

14. A valve means as claimed in claim 13 wherein said sheet-like imperforate material is a metal foil.

15. A valve means as stated in claim 13 wherein said means for pivotally mounting the valve closure sections in the valve body means includes a half trunnion provided on each closure valve section as diametrically opposite points thereon, and means providing a recess on each valve body portion adjacent said plane for aligning and receiving adjacent half trunnions of said closure sections, said sheet-like imperforate material extending between said adjacent half trunnions.

16. A zero leakage storage valve means having substantial effective reclosure capabilities comprising in combination: a valve body means having valve body portions defining a passageway and provided with outwardly extending flanges defining a transverse planar zone; a valve closure means in said passageway and comprising solid imperforate valve closure sections and an imperforate diaphragm member held between said closure sections and extending beyond said sections and between said flanges for holding thereby; means on each closure section and each body portion cooperable in assembly for pivotally mounting the valve closure means without disturbance of said diaphragm member and holding the valve closure means in assembly; and means connected to one closure section for actuation of said valve closure means.

17. A valve means as stated in claim 16 wherein said diaphragm member includes a plurality of metal foil sheets, and an annulus of resilient material at the periphery of said sheets.

18. A valve means as stated in claim 16 wherein said diaphragm member includes a composite laminated member having at least one sheet made of elastomeric material.

References Cited in the file of this patent

UNITED STATES PATENTS

| | | |
|---|---|---|
| 2,358,101 | Randall | Sept. 12, 1944 |
| 2,816,729 | Jensen | Dec. 17, 1957 |
| 2,905,358 | Herbage | Sept. 22, 1959 |
| 2,934,312 | Stevens | Apr. 26, 1960 |

FOREIGN PATENTS

| | | |
|---|---|---|
| 864,497 | Germany | Jan. 26, 1953 |